United States Patent [19]

Martin

[11] Patent Number: 5,904,959
[45] Date of Patent: May 18, 1999

[54] EPOXY-SILICONE COATINGS

[76] Inventor: A. John Martin, 909 NE. Boat St., Seattle, Wash. 98105

[21] Appl. No.: 08/870,645

[22] Filed: Jun. 6, 1997

[51] Int. Cl.$^6$ .............................. C09D 5/16; B05D 1/34
[52] U.S. Cl. ......................... 427/256; 427/386; 427/426; 106/15.05
[58] Field of Search ................... 106/15.05; 427/256, 427/386, 426

[56] References Cited

FOREIGN PATENT DOCUMENTS 1097447  1/1995  China .
6-172682 6/1994  Japan .

*Primary Examiner*—Erma Cameron
*Attorney, Agent, or Firm*—Richard D. Multer

[57] ABSTRACT

Two-part anti-fouling and anti-icing coating materials. The A side contains an epoxy resin, and the B side includes a reactive silicone. Particulate metal may be added to the A side for increased wear and the minimization of differential thermal expansion between the coatings and the substrates to which the coatings are applied. Multiple applications of the coating may be made but are not in all cases required.

4 Claims, No Drawings

EPOXY-SILICONE COATINGS

TECHNICAL FIELD OF THE INVENTION

In one aspect the present invention relates to novel, improved epoxy-silicone coatings.

In a second, more specific aspect, the present invention relates to coatings of the type identified in the preceding paragraph which have the ability to keep plant and animal life from fouling ship and boat hulls and other underwater structures.

And, in a third, also specific aspect, the present invention relates to coatings as characterized above which have the ability to keep ice from forming on and adhering to boat and ship decks and rigging and other structures and to keep mud and other foreign substances from adhering to vehicles and static structures.

BACKGROUND OF THE INVENTION

Ship and boat hulls and other underwater structures are commonly coated to keep barnacles, tubeworms, and other marine organisms from adhering to the hull or other structure. Such organisms can damage the structure to which they adhere and, in the case of ship and boat hulls, significantly increase the drag on the hull as it moves through the water. This disadvantageously reduces the speed which the hull can achieve and increases the fuel required to drive the ship or boat through the water.

Fouling has heretofore been dealt with by coating or impregnating a vessel or structure with a composition containing a microbiocide. Among the microbiocidal compounds heretofore employed to retard fouling by marine organisms are tributyl tin, copper dioxide, and copper hydroxide. All of these compounds are water-soluble, self-leaching, and highly toxic. Current federal regulations prohibit the use of coatings which contain tributyl tin and regulations limiting the use of copper dioxide and copper hydroxide are being promulgated in ever increasing numbers in the interest of protecting the marine ecosystems.

There is accordingly a current and continuing need for new coatings which can be employed to retard the fouling of vessels and underwater structures with the effectiveness of those heretofore available but which will, at the same time, not require the highly toxic compounds currently employed in anti-fouling coatings.

Icing is another pervasive problem. For example, ice may accumulate in a thickness of many inches on the rigging of a boat fishing in Arctic or sub-Arctic waters. This can make the vessel top heavy and significantly affect the stability of the vessel. Also, drag is increased with a concomitant increase in fuel consumption.

Equally well known problems arise when ice and mud accumulate on other structures. As a single example, the freezing of water to the inner walls of a coal hopper can make it difficult and expensive to unload the coal from the hopper.

Consequently, there is also a need for coatings which can be employed to inhibit the build-up of ice and mud on a variety of structures in circumstances where such build-up would be disadvantageous.

SUMMARY OF THE INVENTION

Novel coatings with both antifouling and anti-icing capabilities have been invented and are disclosed herein (the term "anti-fouling" is employed in the description and characterization of the present invention to identify coatings which: (a) inhibit the adhesion and adherence of: marine organisms to ship and boat hulls and other underwater structures, mud to land vehicles, and other unwanted foreign material to vehicles and static structures; and (b) readily shed such material as may accumulate on the coating). These coatings are two-part, A–B systems with the components being combined at the time of application. The A component contains an epoxy resin, and the B component contains a reactive silicone fluid. Increased wear and minimization of unwanted differential expansion may be imparted to the coating by adding stainless steel or aluminum particulates to the A component of the system.

Aside from their anti-fouling and anti-icing properties and their ability to shed mud and other foreign materials, the novel coating systems disclosed herein have the advantage of being free of toxic constituents. These coatings are also durable and waterproof.

In many cases, the mere movement of a vessel through the water will wash away any marine organisms that may have adhered to the coating. And, in extreme cases and in applications where the coating is applied to a static substrate such as a piling in still water, only minimal hydraulic pressure is needed to wash away adherent plants and animal life.

The objects, features, and advantages of the invention will be apparent to the reader from the foregoing, the appended claims, and the ensuing detailed description and discussion of the invention.

DETAILED DESCRIPTION OF THE INVENTION

As pointed out above, the novel coating systems disclosed herein have an epoxy-based A component and a silicone-based B component and may include the addition of particulate stainless steel or aluminum to the A component of the system.

The A side epoxy resin is produced from bisphenol-A and epichlorohydrin and has the formula:

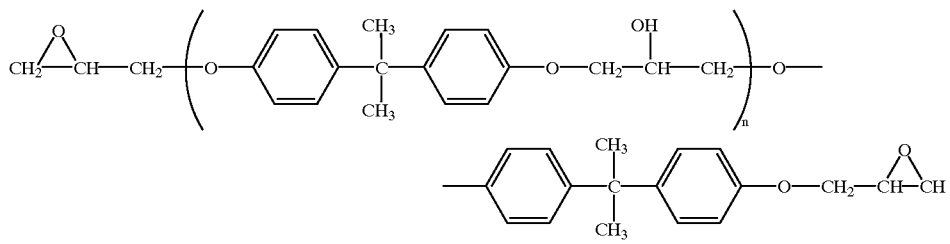

A preferred epoxy resin of this type is marketed by Nanya Plastics under the designation NPEL-128. That epoxy has the following characteristics:

| | |
|---|---|
| Epoxy Equivalency (gleq) | 184–190 |
| Viscosity (cps at 25 degrees Celsius) | 12000–15000 |
| Color (Gardner-Holt method in 70% butyl carbitol solution) | 1 MAX |

As discussed above, particulate aluminum or stainless steel may be added to the A side formulation for increased wear and to match the thermal expansion of the coating to that of the substrate. Preferred is 316L stainless steel flake which is available from United States Bronze Powders, Inc. It has the following composition:

| Ingredient | Weight Percent |
|---|---|
| Iron | 66–71 |
| Chromium | 16–18 |
| Nickel | 10–14 |
| Molybdenum | 2–3 |
| Manganese | 0–2 |
| Silicon | <1 |
| Fatty Acid | <1 |

Chromium, nickel, and manganese are subject to the toxic chemical reporting requirements of 40 CFR 372. However, 316L is stable in marine and other adverse environments and does not pose the threat to the environment or the food chain that the now regulated and banned tin and copper and other toxic metals do. In fact, 316L stainless steel is used inside the human body—for example, to fasten broken bones together.

For applications of the invention employing a particulate metal additive a solvent is used to promote uniform distribution of the metal in the epoxy resin. Xylene is the preferred solvent.

The B side of the coating composition contains the above-mentioned reactive silicone and a mixture of hardeners for the silicone resin.

A mixture of two different types of hardeners is employed so that the formulation will have a useful pot life at the temperatures encountered in the transportation, storage, and application of the material, yet cure to a hard durable coating. One of the hardeners is considered to act as a curing agent and the other as an accelerator.

The preferred reactive silicon is marketed by Shin-Etsu Chemical Co., Ltd. under the designation KF-103. The KF-103 silicone is an epoxy-modified, side chain polysiloxane of the formula:

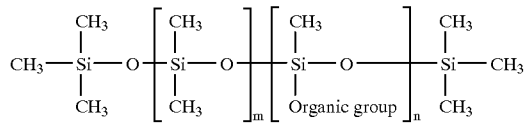

with the organic group having the formula:

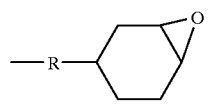

where the structure of the radical R is Shin-Etsu proprietary information.

The currently preferred mixture of hardeners A is made up of 43 weight percent Shell Oil Company's 3115X70 (curing agent) and Ancamine MCA (accelerator) which is supplied by Pacific Anchor Company. 3115X70 is a mixture of fatty acid polyamides, and Ancamine MCA is a Mannich base cycloalphatic amine.

It is to be understood, in conjunction with the foregoing, that the specifically identified epoxy, stainless steel flakes, reactive silicone, and hardeners are only preferred and not essential. Equivalent constituents can be employed as can particulate aluminum as well as epoxies, reactive silicones, and hardeners selected within the scope of the invention to optimize a coating system for a particular application or for use in a particular environment.

Formulations for the A and B components follow:

A Component (no metal additive)

| Constituent | Range (Weight Percent) | Preferred (Weight Percent) |
|---|---|---|
| Epoxy | 100 | 100 |
| Epoxy | 47 to 86 | 61 |
| Solvent | 4 to 13 | 10 |
| Particulate Metal | 10 to 40 | 29 |

B Component

| Constituent | Amount |
|---|---|
| Reactive Silicone and Curing Agent | Equal parts by weight +/− 10 weight percent of the reactive silicone and the curing agent |
| Accelerator | 40–70 weight percent based on the weight of the silicone |

A preferred B side component is formulated as follows:

| Constituent | Weight Percent |
|---|---|
| Reactive Silicone | 30 |
| Curing Agent | 30 |
| Accelerator | 40 |

Of perhaps the most importance in formulating the B component is the ratio of the accelerator to silicone. Amounts below the lower limit will result in the cured coating being soft and rubbery (a "green" coating) rather than hard as is required for the uses to which the coating systems of the present invention are put. Amounts in excess of the stated upper limit may unacceptably reduce the pot life of the coating material and/or cause the coating to harden during the application process.

Components A and B are typically employed in equal volumes with components A and B first being prepared separately, typically using a motor driven paint mixer operated at low to medium speed. Next, the two components are thoroughly blended (this takes at least two minutes). After blending, the two-component system is allowed to stand for 10–15 minutes to initiate reactions which link up the A side and B side polymers.

It is not essential that equal volumes of the A and B components be employed. The ratio may range between: (a) 45 volume percent of Component A to 55 volume percent of Component B and (b) 55 volume percent of Component A to 45 volume percent of Component B.

Surface preparation is important in the application of the novel coatings disclosed herein. Protocols for representative substrates are described below.

New Steel-Reduce the surface as by sand blasting, etching, and/or mechanical sanding to a Spec. 6 (white metal) finish. Prime the surface in accord with the manufacturer's instructions with an anti-corrosive epoxy primer such as ProLine Inc's 4002. If the surface has flash rusted, instead prime the surface with Corroseal (Supplied by International Rustproof Co.) or a comparable rust conversion system in accord with the manufacturer's directions.

Existing Steel (Rusted)-Treat with a Corroseal or other rustproofing system following the instructions of the manufacturer.

Aluminum-Reduce the surface to white metal by sand blast, etching, or mechanical sanding to a minimum 80 grit finish. The surface to be primed must be free of particulate contaminants as well as greases and oils. Prime the prepared surface with an A/B two-part strontium, zinc chromate primer such as Pro-line 4018. Allow the primer to dry and cure.

Fiberglass-Remove any existing non-epoxy based antifouling coatings to at least the boundary layer (the depth just below the interface between the coating and the gel coat). Remove, prepare, and fill any surface blemishes (bubbles). Fair the surface to 80 grit texture, clean with isopropyl alcohol or acetone, and dry. If osmosis blisters are present, follow the procedures for recommended blister repair. Allow the surface to dry.

Surface preparation is followed by the application of an initial tack layer of an epoxy polymer such as the above-discussed Nanya NPEL.

The tack coat is applied in a thickness of 0.5 to 1 mil using a paint brush, roller (epoxy short nap or foam), or spray gun. The equipment, if spraying is selected, should be of the HVLP (High Volume, Low Pressure) type employing a high solids tip. The gun is connected to a pressure pot. The operating pressure is maintained at approximately 30 psi (internal pot pressure).

If a metal-containing coating is to be employed, the application of the tack coat is followed with the application of a second coat which is also formulated in accord with the principles of the present invention but includes particulate stainless steel or aluminum.

The second coat is applied to the tack coat after the latter has reached a tacky stage but has not hardened. This typically requires 30 to 45 minutes, depending upon the temperature of the surrounding environment. It is important that the second coat be applied to the tack coat before the latter has hardened so that the second coat will optimally bond to the tack coat.

The application protocol for horizontal and vertical surfaces is somewhat different as described below:

Horizontal Surfaces-Apply two 5–7 mil thick coats of the metal flake-containing, two-component formulation, allowing approximately 30 to 45 minutes between coats, depending on the ambient temperature, so that the second coat can bond to the first coat after the latter has reached a tacky stage.

Vertical Surfaces-Apply two successive 5–7 mil coats of the metal-containing formulation with a somewhat longer time (typically one hour) between coats to inhibit sheeting, running, and sagging.

If a metal-containing coat is employed, a non-metal coating is applied over the last metal-containing coat, again while the exposed coat is still tacky, so that the last applied coat can bond to the underlying, metal-containing coat.

In applications not involving the use of a metal-containing formulation, the application of a single coat of a metal-free, epoxy silicone formulation over the tack coat may provide adequate durability and service life although multiple coats provide a longer service life along with the capabilities of inhibiting the adherence of ice and other unwanted substances to the coated substrate and of readily shedding any material that may stick to the coating. Single coats are applied in a thickness of 3–5 mils with a thickness at the upper end of this range being preferred.

Multiple applications of the metal-free formulation can of course be employed to provide increased durability, abrasion resistance, and the like. Coats having a thickness of 3 to 5 mils are applied with each coat being applied while the underlying coat is still in a tacky stage so that the overlying coat will bond to the coat beneath it.

The mechanism by which the two-component formulations disclosed herein inhibit the build-up of ice and the adherence of marine organisms is not completely understood. However, it is clear that, as the coating systems cures (or hardens), the epoxy and silicone polymers form a matrix in which silicone moieties are mobile and that these moieties migrate toward the exposed surface of the coating during the curing or hardening process, but are "locked" or linked the matrix structure and immobilized by the time the curing reactions are completed. The result is a stratified coating which is silicone rich at the exposed surface and decreases in silicone content as the distance from the exposed surface increases. This results in the coating being essentially non-porous; i.e., free of pores, pockets, and other voids in which water and other substances could accumulate and form an anchor for ice, marine organisms, or other foreign materials. The cured coating material also has a low coefficient of function which keeps marine organisms, ice, and other artifacts and foreign substances from adhering to the coating. At the same time, the silicone and the epoxy remain balanced such that the coating remains hard and durable, albeit flexible enough to accommodate thermal bending, as well as other differential stresses and relative movement between the coating system and the substrate to which that system is applied.

It is considered important, in this respect, that a dual ended polysiloxane (or silicone) be employed in the two-component coating formulations of the present invention. This results in the reactive silicone being tied at both ends to the epoxy, bonding the silicone moieties tightly in the matrix and immobilizing the silicone as the coating cures.

When the coating wears and the concentration of silicone decreases to a level at which an unacceptable degree of porosity might occur, the efficacy of the coating can be easily restored at a modest cost by applying a new coat of the non-metal containing coating material directly to the existing coating. It is not necessary to strip the existing coating and start from bare metal as a freshly applied coat will bond to the existing coating, albeit not as perfectly as it would if the existing top coat were still in the tacky state described above.

The superior physical properties of the novel coatings disclosed herein are confirmed by ultraviolet, permeability, abrasion, and salt/steam blister tests conducted by an independent laboratory in accord with ASTM Standards ASTM B 117 and 1654; ASTM Designation G-23; Mil-A-8625F; and BAC 5022.

Preferred Formulation (with no metal—identified below as silicone epoxy)

Sample:

Four 4"×6" aluminum panels coated with silicone epoxy

Panels 1 and 3 were primed with an industry standard aluminum primer

Panels 2 and 4 were prepared using an experimental etching process

Test:

The panels were inserted into a 5% salt spray environment in a cabinet in accordance with ASTM B 117. The panels were removed from the cabinet at the conclusion of the test period, lightly washed, and air dried. The panels were then visually evaluated.

Evaluation:

ASTM D 1654—Standard Evaluation of Painted or Coated Parts Subjected to Corrosive Environments:
Procedure A—Scribed Area
  Panel 1: 7080 hours—No corrosion or loss of adhesion
    Rating Number 10
  Panel 2: 1680 hours—Partial loss of adhesion at 1300 hours
    Complete loss of adhesion by 1680 hours
    Rating Number 0
Procedure B—Unscribed Area
  Panel 3: 7080 hours—No corrosion or loss of adhesion
    Rating Number 10

Preferred Formulation with Stainless Steel Flakes (identified below as H-15)

Sample:
Five panels, two 4"×6" aluminum panels and three 5"×10" steel panels
Panel 1-4"×6" aluminum panel with H-15 coating over a zinc chromate aluminum primer, (316L stainless steel flake 30% by volume, silicone epoxy)
Panel 2-5"×10" steel panel with H-15 coating, zinc chromate aluminum primer, (316L stainless steel flake 30% by volume, silicone epoxy)
Panel 3-5"×10" steel panel with Corroseal
Panel 4-4"×6" aluminum panel with Corroseal
Panel 5-5"×10" steel panel with Corroseal Test:
Three of the panels were inserted into the cabinet in a 5% salt spray environment and held in accordance with ASTM B 117. The panels were removed from the cabinet at the conclusion of the test period, lightly washed, and air dried. The panels were then visually evaluated. Two of the panels were inserted into an ultraviolet light-exposure apparatus in accordance with ASTM Designation G-23.

At the conclusion of the test period the panels were visually examined.

Evaluation:
ASTM D 1654—Standard Evaluation of Painted or Coated Parts Subjected to Corrosive Environments:
Procedure B—Unscribed Area
  Panel 1: 7080 hours—No corrosion or loss of adhesion
    Rating Number 10
  Panel 2: 7080 hours—No corrosion or loss of adhesion
    Rating Number 10
  Panel 3: 7080 hours—Minimal corrosion, loss of adhesion
    Rating Number 9
  Panel 4: 2160 hours—Partial loss of adhesion at 1680 hours
    Complete loss of adhesion by 2160 hours
    Rating Number 0
ASTM B 714—Standard Method of Evaluating Degree of Blistering of Paints
  Panel 1: 7080 hours—None
  Panel 2: N/A because of adhesion failure
  Panel 3: 7080 hours—None
  Panel 4: N/A because of adhesion failure The independent laboratory concluded that the adhesion failure experienced with panels 2 and 4 was due to improper panel preparation and not defects in the coating material.

In another test designed to evaluate resistance to abrasion as well as surface loss due to friction, 2 inch square panels coated with the H-15 system were placed in a Tabor Abrasion Test Instrument and rotated clockwise with each revolution counted. A C-10 wheel (commonly used to test hard anodized coatings) weighted with a 1000 gram counterbalance and rotating anti-clockwise was lowered to the surface with each rotation under load being counted.

After 1000 cycles with zero effect—no scratches or loss of material—the C-10 wheel was exchanged for a much more aggressive wheel. Specifically, a H-22 high abrasion wheel was installed and the test continued as before (in almost all cases 200 cycles with the H-22 wheel will completely remove a hard anodized coating from its substrate).

After an additional 1000 cycles the panel was pulled from the Tabor Test Instrument and weighed. The result showed less than 0.03 gram of material loss. On reviewing the panel after the test, the 0.03 grams were found to be related to minor scratches and abrasions on the coating surface. Results showed that the H-15 coating was highly resistant to abrasion and impact.

The anti-icing properties of the invention was demonstrated by a test in which the H-15 coating system was applied to the underwater forward one-third of the bow area of a 185 foot crab catcher/processor vessel working in Alaskan waters. The coating system was also applied to the anchor windlass, the bow gunnels, and the forward pilot house bulkhead. On the way to Dutch Harbor in the Aleutian's, in the dead of winter, the vessel ran into icing conditions; and ice started to build up over the entire boat during the night. On arrival in Dutch Harbor the next morning, it was discovered that the only parts of the vessel flee of ice were those areas to which the H-15 coating system had been applied. It was found that, while ice would build up on the coated areas, it would not bond or adhere. When the vessel took green water over the bow, the impact would wash the ice away from the coated area.

In another situation, ice was building up on the same boat from freezing spray, salt water whipped tip by high winds, and freezing temperatures. Waves were not being taken over the bow, and the ice did not wash away. However, when the weather calmed, it was again found that the ice had not bonded to those areas of the vessel coated with the H-15 system and the ice could accordingly be easily broken up and removed.

To confirm the anti-fouling capabilities of the present invention, two 5 mil thick coats of the H-15 coating material were applied as described above over an existing epoxy coating to the hull of a 43 foot, twin engine motor yacht. Over seven months later, the yacht was hauled; and the bottom was inspected.

Those sections of the hull subjected to strong hydraulic action from the boat moving through water were found to be quite clean. On the areas where there was very little hydraulic action such as the transom and just aft of the bow wave barnacles were found attached with many healthy adults in the community. Removal of the barnacles was surprisingly easy. Using only a rag and a hose and water, it proved possible to completely clean and remove all traces of bio-contaminants, sauna as well as flora. Most important, the barnacles took all parts with them, leaving a clean hull behind.

It is to be understood that the coating systems of the present invention have applications other than protecting bottoms from fouling and keeping vessels from icing up in adverse environments. For example, such systems may be employed to protect pilings and other underwater structures against fouling by bio adhesion. The coating systems of the present invention may be employed in anti-icing roles in a virtually limitless number of circumstances in which icing is a problem—for example, to keep coal and other products from freezing to the railroad cars in which the product is transported, to keep street signs from icing up, and to keep ice from adhering to trucks and other vehicles.

The invention may be embodied in many forms without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraces therein.

What is claimed is:

1. A method for inhibiting the adherence of substances to a substrate, said method comprising the steps of:
    coating an exposed surface of said substrate with a curable silicone-epoxy coating material and subjecting the coated substrate to a curing process;
    said coating material being so formulated that silicone moieties of the coating material migrate to an exposed surface of the coating as the curing process proceeds, providing a stratified coating with a silicone-rich exposed surface and a gradient of silicone which declines from said surface to the interior of the coating.

2. A method as defined in claim 1 in which said reactive silicone is an epoxy-modified, polysiloxane.

3. A method as defined in claim 1 in which the epoxy resin is epichlorohydrin based.

4. A method as defined in claim 1 in which the volume ratio of A side component to B side component is in the range of 45:55 to 55:45.

* * * * *